3,574,229
AZIRIDINYL PHTHALOCYANINE PIGMENT

Roy A. Pizzarello, Franklin Lakes, and Alfred F. Schneid and John J. De Lucia, New Milford, N.J., assignors to Inmont Corporation, New York, N.Y.
No Drawing. Continuation-in-part of application Ser. No. 360,099, Apr. 15, 1964, which is a continuation-in-part of applications Ser. No. 62,827, Ser. No. 62,856, and Ser. No. 62,873, all filed Oct. 17, 1960. This application Sept. 26, 1967, Ser. No. 670,758
Int. Cl. C07d 27/76; C09b 47/04
U.S. Cl. 260—314.5                    1 Claim

ABSTRACT OF THE DISCLOSURE

A water-insoluble reactive green pigment which is copper phthalocyanine-3,3′,3″-tri-(methylaziridinyl) sulfonimide is prepared. The pigment can be used in textile printing and the like.

---

This application is a continuation-in-part of our copending application Ser. No. 360,099, filed Apr. 15, 1964, now abandoned, which was a continuation-in-part of our prior applications Ser. Nos. 62,827; 62,856; and 62,873, all filed Oct. 17, 1960 and now abandoned.

Reactive dyestuffs are already known. They are colored compounds containing atoms or groups of atoms capable of reacting with fibers. Generally they are water soluble and are used mainly on cellulosic fibers, although application to silk, wool, and nylon have been mentioned. These dyestuffs, when not yet reacted, should preferably have little affinity for the fibers so that the surplus can be washed away. Alkali is required when the reaction splits off acid, for example when the reactive atom is chlorine. Compounds containing triazine radicals with chlorine or bromine attached directly to a triazine ring or to a pyrimidyl radical form one class of commercially available dyestuffs. Others contain the radicals beta-halogenopropionyl, beta-halogenoethylsulfonyl, chloroacetylamine, alkyl phosphite, beta-hydroxyethylsulfonyl, beta-(chloromethyl)-beta-sulfatoethylsulfonyl, and sulfone fluoride.

The pigment of this invention is made by the following method.

(a) Copper phthalocyanine-3,3′,3″-trisulfone chloride

To 1500 g. chlorosulfonic acid maintained at a temperature below 60° C. were added 193 g. copper phthalocyanine over a half hour period. The mixture was heated at 70° C. for 1 hour and then brought up to 130° C. over a period of 1½ hours and then held at 130–135° C. for 4 hours. The mass was cooled to 60° C. and then 600 g. of thionyl chloride were added over a period of ½ hour, keeping the temperature below 30° C. It was heated at 100° C. for 1 hour, and cooled to room temperature. After drowning in 4 liters of water and ice mixture, it was filtered and washed with ice water until Congo Red no longer indicated the presence of acid. The dried material was a greenish blue powder (298 g.) containing 11.58% by weight of sulfur. Copper phthalocyanine-3,3′,3″-trisulfone chloride has a theoretical S content of 11.1% by weight. This chlorosulfonation adds sulfone chloride groups in the 3-position, as the art has known for some time, via the "PB" reports, for example.

(b) Copperphthalocyanine-3,3′,3″-trisulfonimide 31 g. of the powder thus prepared were added to a solution of 11 g. sodium carbonate and 6.2 g. propylenimine (which is 2-methyl aziridine) in 200 ml. water at a temperature of 45° C. The addition was made over a period of ½ hour. The temperature was maintained at 45–50° C. for 2 hours and then the material was filtered and washed free of alkali with water. The dried material consisted of 30.5 g. of green powder. The active hydrogen of propylenimine reacts with the chlorine of the sulfone chloride groups to form sulfonimide groups whose formula is

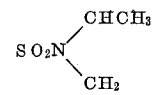

This pigment reacts with textile fibers, especially cellulosic ones and with certain reactive groups present in polymeric materials. The activity of the pigment in this is due to opening to the aziridinyl ring.

The pigment may be appled to textiles by printing and paddng, the finished materials having enhanced resistance to laundering and drycleaning. If the printing paste contains a resin that reacts with the aziridinyl ring, such as a carboxyl-containing butadiene- acrylonitrile latex, the finished textile will be even more wash resistant. The aziridinyl rings probably react with the textile fibers as well as with reactable resins or thickeners.

What is claimed is:

1. Copper phthalocyanine-3,3′,3″-tri-(methylaziridinyl) sulfonimide.

References Cited
UNITED STATES PATENTS
3,261,824   7/1966   Randall et al. _____ 260—314.5

HENRY R. JILES, Primary Examiner

H. I. MOATZ, Assistant Examiner

U.S. Cl. X.R.
8—54.2